W. C. MALOZ.
LIQUID DISPENSER.
APPLICATION FILED JAN. 30, 1912.
1,029,076.
Patented June 11, 1912.
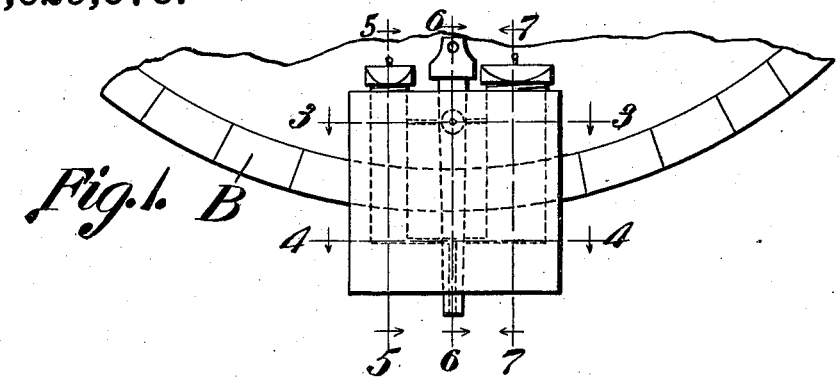
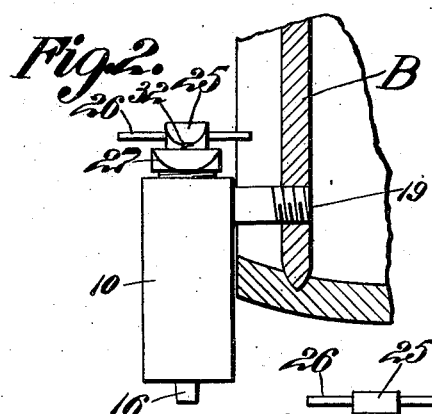
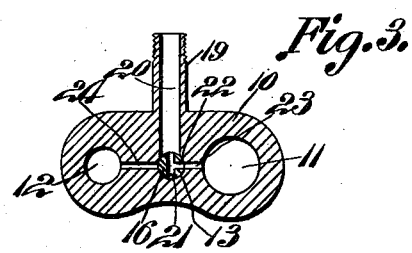
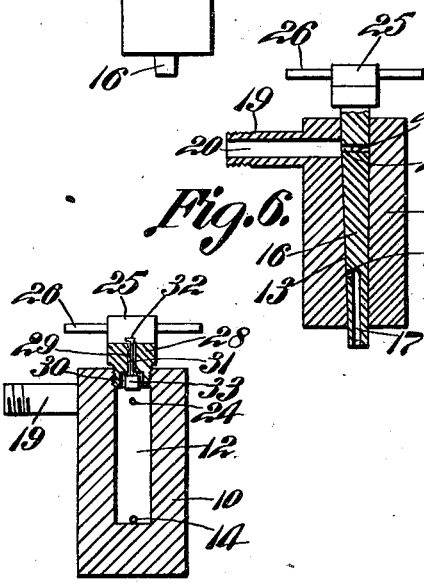
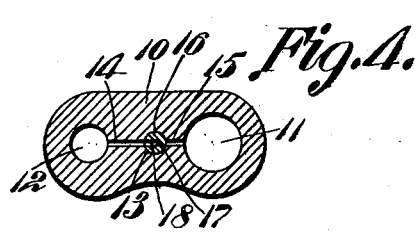
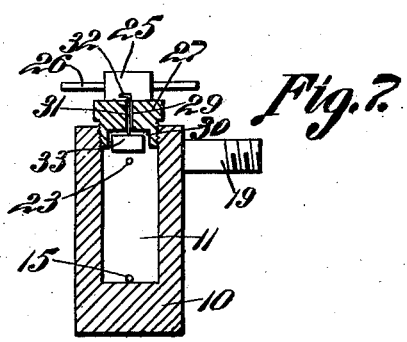
Witnesses
Walter C. Maloz,
Inventor
by C. A. Snow & Co.
Attorneys

UNITED STATES PATENT OFFICE.

WALTER CHRISTIAN MALOZ, OF PATTERSON, LOUISIANA, ASSIGNOR, BY DIRECT AND MESNE ASSIGNMENTS, OF ONE-THIRD TO DAVID H. MALOZ, OF PATTERSON, LOUISIANA, AND ONE-THIRD TO WILLIAM P. BRADY, OF NEW ORLEANS, LOUISIANA.

LIQUID-DISPENSER.

1,029,076.   Specification of Letters Patent.   Patented June 11, 1912.

Application filed January 30, 1912. Serial No. 674,296.

*To all whom it may concern:*

Be it known that I, WALTER C. MALOZ, a citizen of the United States, residing at Patterson, in the parish of St. Mary and State of Louisiana, have invented a new and useful Liquid-Dispenser, of which the following is a specification.

This invention relates to liquid dispensers, and has for its primary object to provide a dispenser adapted to communicate with a source of supply of liquid, such as a barrel, cask, tank or the like, and which shall be readily operable to dispense a predetermined amount or predetermined amounts of the liquid.

This invention also has for its object to dispense with the common measures for measuring and dispensing vinegar, cider, beverages and other liquids, or semi-liquids in grocery stores, liquor stores, and the like, to accurately and rapidly permit the liquid to be dispensed in predetermined amounts, and thereby obviate the insanitation and waste accruing from the use of common measures.

To the above ends, this invention is embodied in the novel construction and combination of parts elicited in the following description and pointed out in the appended claims, it being understood that this device is susceptible of alterations or deviations in its details within the scope of the appended claims without departing from the spirit of the invention.

The preferred embodiment of the invention is illustrated in the accompaying drawings, wherein similar reference characters indicate similar parts, and wherein:

Figure 1 is a front elevation of the device as applied to a barrel. Fig. 2 is a side elevation thereof, the barrel being shown in section. Figs. 3, 4, 5, 6 and 7 are sections on the respective lines 3—3, 4—4, 5—5, 6—6 and 7—7 of Fig. 1.

Referring in detail to the drawings, the numeral 10 designates a wooden or metallic body, whichever is preferable, which body has a vertical tapered spigot socket 13 extending therethrough and the respective recesses 11 and 12 in its upper end at the sides of spigot socket to form liquid measures of different capacities. The body 10 is provided with a nipple 19 projecting from the rear side thereof, which nipple 19 has the duct 20 extending to and communicating with the spigot socket 13. The liquid measure 11 is provided with an inlet 23 which extends to and communicates with the spigot socket 13 and the said liquid-measure is provided with a discharge outlet 15 extending from the lower end thereof to the spigot socket, while the liquid measure 12 is provided with an inlet 24 extending to the spigot socket and a discharge outlet 14 extending from the lower end of the liquid measure 12 to the said spigot socket. The respective liquid measures 11 and 12 are provided with closures 27 and 28, which are screw-threaded into the upper ends thereof, and each of the said closures has an air vent 29 extending therethrough and a valve seat 30 at the lower end of the vent. A buoyant valve 33 is arranged below the air vent 29 of each of the closures and is adapted to be raised upon the corresponding measures becoming filled to close the passage through the vent and thereby prevent the liquid from escaping through the air vent, but permitting the air to escape therethrough as the measure is being filled. This valve 33 is provided with a stem 31 passing loosely through the air vent and which has the upper end thereof bent angularly as designated by the numeral 32 to normally seat or bear on the top of the closure to suspend the valve at a suitable distance below the seat 30 and thereby preventing the valve from dropping into the corresponding measure. The tapered spigot 16 fits snugly through the spigot socket. This spigot 16 has a diametrical duct 21 extending therethrough adapted to register with the inlets 20, 23 and 24, and the said spigot 16 has a duct 22 extending radially from an intermediate portion of the duct 21 to the exterior of the spigot, which duct 22 is adapted to register with the said inlets. The spigot also has a longitudinal discharge duct 17 extending upwardly from the lower end thereof, with the upper end of the duct 17 extending angularly to the periphery of the spigot, thus forming a branch duct 18, which is adapted to register with the discharge outlets 23 and 24 of the respective liquid measures 11 and 12. The spigot 16 is also provided with a head 25 and pin 26 extending through the head for convenience in rotating or turning the spigot.

In use, the nipple 19 is engaged through the barrel, cask or tank B, or is otherwise connected to a supply of liquid to establish a communication of the liquid into the body 10 of the dispenser. Normally, the spigot 16 is so turned that the duct 22 registers with the duct 20 in which event the duct 21 registers with the inlets 23 and 24 of the measures 11 and 12, whereupon the liquid flows into the measures, communication having been established between the respective inlets. When the measures become filled, the buoyant valves 33 rise against the seats 30 of the closures, thereby closing the passages through the air vents, which air vents permit the escape of air as the measures are being filled, and the flow of liquid into the measures will therefore be stopped, the valves 33 in being closed preventing the escape of liquid through the air vents. The branch duct 18 extends in a direction opposite to the duct 22 and is normally out of registration with either of the outlet ducts 14 and 15. Then by turning the spigot in either direction, the duct 18 may be made to register with the discharge outlet of the corresponding measure (measure 12 in Figs. 3 and 4), in which event, the liquid will be discharged or will escape through the discharge outlet thereof and through the ducts 18 and 17 of the spigot, the communication between the inlet 20 and the inlet of the corresponding measure having been cut off. Thus either measure may be alternately filled and emptied, through its inlet and outlet, respectively, the communication between the inlet 20 and the inlet of either measure and between the outlet of the corresponding measure and the duct 18 being alternately established and cut off by the rotation or turning of the spigot. Then by turning the spigot to normal position the emptied measure is again filled. In this manner, all of the measures are normally filled and any one may be emptied. This invention therefore provides a dispenser for liquids which is readily operable to dispense a predetermined amount or predetermined amounts of the liquid, according to the capacity of the liquid measures, say a pint and a quart, and will dispense or obviate with the common measures, which are more or less insanitary and wasteful.

Having described the invention, what is claimed as new is:—

1. In a liquid dispenser adapted to communicate with a supply of liquid, a plurality of liquid measures each having an inlet and outlet, and means for establishing the flow of the liquid into all of the inlets simultaneously, for cutting off the flow of the liquid through any one of the inlets, and for inversely establishing and cutting off the discharge of the liquid from the outlet of any measure as the flow to the measure is established or cut off, so that all of the measures may be normally filled and any one may be emptied.

2. In a liquid dispenser, a body embodying a plurality of liquid measures, and a rotary spigot in the body, the body having an inlet extending to the spigot, each measure having an inlet and an outlet extending to the spigot, and the spigot having ducts to establish a communication between the inlet of the body and all of the inlets of the measures simultaneously and being adapted to cut off the flow through any inlet of the measure, and having ducts to permit the liquid to flow from the outlet of the corresponding measure when the flow through the inlet of the said measure is cut off, so that all of the measures may be normally filled and any one may be emptied.

3. In a liquid dispenser, a body having a vertical spigot socket therethrough, a plurality of recesses in its upper end to form liquid measures, an inlet for the body extending to the spigot socket, an inlet for each of the liquid measures extending to the spigot socket, and an outlet for each of the liquid measures extending from the lower end of the liquid measure to the spigot socket, a closure for each of the liquid measures and having an air vent therethrough; buoyant valves for closing the vents through the closures when the liquid measures become filled; and a spigot fitting through the spigot socket and having ducts to establish a communication between the said inlet of the body and all of the inlets of the liquid measures simultaneously and being adapted to cut off the flow through any inlet of the measures, and having ducts to permit the liquid to flow from the outlet of the corresponding measure when the flow through the inlet of the said measure is cut off, so that all of the measures may be normally filled and any one may be emptied.

4. A liquid dispenser adapted to communicate with a supply of liquid and embodying a plurality of liquid measures, and means for permitting all of the measures to be filled simultaneously, and for cutting off the flow to any one measure and at the same time to permit the liquid to be discharged from the measure.

In testimony that I claim the foregoing as my own, I have hereto affixed my signature in the presence of two witnesses.

WALTER CHRISTIAN MALOZ.

Witnesses:
 Edw. Dubroc,
 Lee Penny.

Copies of this patent may be obtained for five cents each, by addressing the "Commissioner of Patents, Washington, D. C."